INVENTORS
PETER ERIC AXON
CECIL HENOCQ
BY
William J. Flynn
Attorney

INVENTORS
PETER ERIC AXON
CECIL HENOCQ
BY William J. Flynn
Attorney

United States Patent Office 3,137,767

Patented June 16, 1964

3,137,767

TAPE TRANSPORT MECHANISM FOR MAGNETIC RECORDING AND/OR REPRODUCING APPARATUS

Peter E. Axon, London, and Cecil Henocq, Sussex, England, assignors to Clevite Corporation, Cleveland, Ohio, a corporation of Ohio Filed Apr. 13, 1959, Ser. No. 806,122
6 Claims. (Cl. 178—6.6)

This invention relates generally to a tape transport mechanism for a magnetic recording and/or reproducing apparatus, and is particularly directed to such a tape transport mechanism having provision for precisely controlling the tape tension and speed during recording or playback.

One practical technique for the recording of television programs on magnetic tape and the playing back of such programs from the tape involves advancing the tape past the recording or playback head at a high speed, such as of the order of 200 inches per second. In order to record and reproduce such high frequency signals satisfactorily, it is imperative that the tension in the tape be maintained substantially constant throughout the program recorded thereon. Moreover, the tension in the tape should be such as to provide a good high frequency recording and reproducing effect without stretching the tape beyond its elastic limit. Any significant variations in the tape tension will tend to alter the effective separation between the tape and the recording or reproducing head, as well as to affect the alignment of the tape with respect to the heads, which would tend to produce variations in the response. While various arrangements have been proposed heretofore for maintaining a magnetic tape under tension during recording or playback, the practical requirements involved in the use of such prior arrangements, particularly in sound recording and reproduction, were much less stringent than those involved in the recording and reproduction of television programs or other applications where the tape must be advanced at extremely high speed during recording and playback. Accordingly, such previously proposed arrangements are quite inadequate for the purposes of the present invention.

Another problem, which is closely interrelated with the problem of maintaining proper tape tension, is the problem of maintaining proper speed of the tape during both recording and playback. During recording, the tape speed should be kept substantially constant throughout. This is rather difficult to achieve with the precision required for the successful recording of high frequency signals, such as are involved in the recording of television programs. Moreover, during subsequent reproduction of the recorded program from the tape, the tape must be advanced at a speed substantially in synchronism with its speed during recording and correction must be made for any speed errors which occurred during recording. Here again, the practical problems involved are quite severe and the previously proposed arrangements for controlling the tape speed during recording and playback are not adequate for this purpose.

The present invention is directed to a novel tape transport mechanism which satisfactorily solves all of these difficulties and which is entirely practical for incorporation in apparatus for magnetically recording and/or reproducing television programs.

It is, therefore, an object of this invention to provide a novel and improved tape transport mechanism suitable for incorporation in apparatus for magnetically recording and/or reproducing television programs.

It is also an object of this invention to provide such a tape transport mechanism having novel provision for maintaining the proper tension in the tape during recording or playback.

Another object of this invention is to provide such a tape transport mechanism having novel provision for controlling precisely the speed of the tape.

Another object of this invention is to provide such a tape transport mechanism having novel provision for synchronizing the speed of the tape during playback with its speed during recording and also for compensating for any speed errors of the tape which occurred during recording.

Another object of this invention is to provide such a tape transport mechanism which includes motor-driven supply and take-up reels and which has novel provision for controlling the speed of rotation of the supply and take-up reels so as to maintain the proper linear speed of the tape between these two reels as the tape is progressively unwound from the supply reel and wound up on the take-up reel during recording or playback.

Further objects and advantages of this invention will be apparent from the following description of a presently-preferred embodiment thereof which is illustrated in the accompanying drawings:

Figure 1:
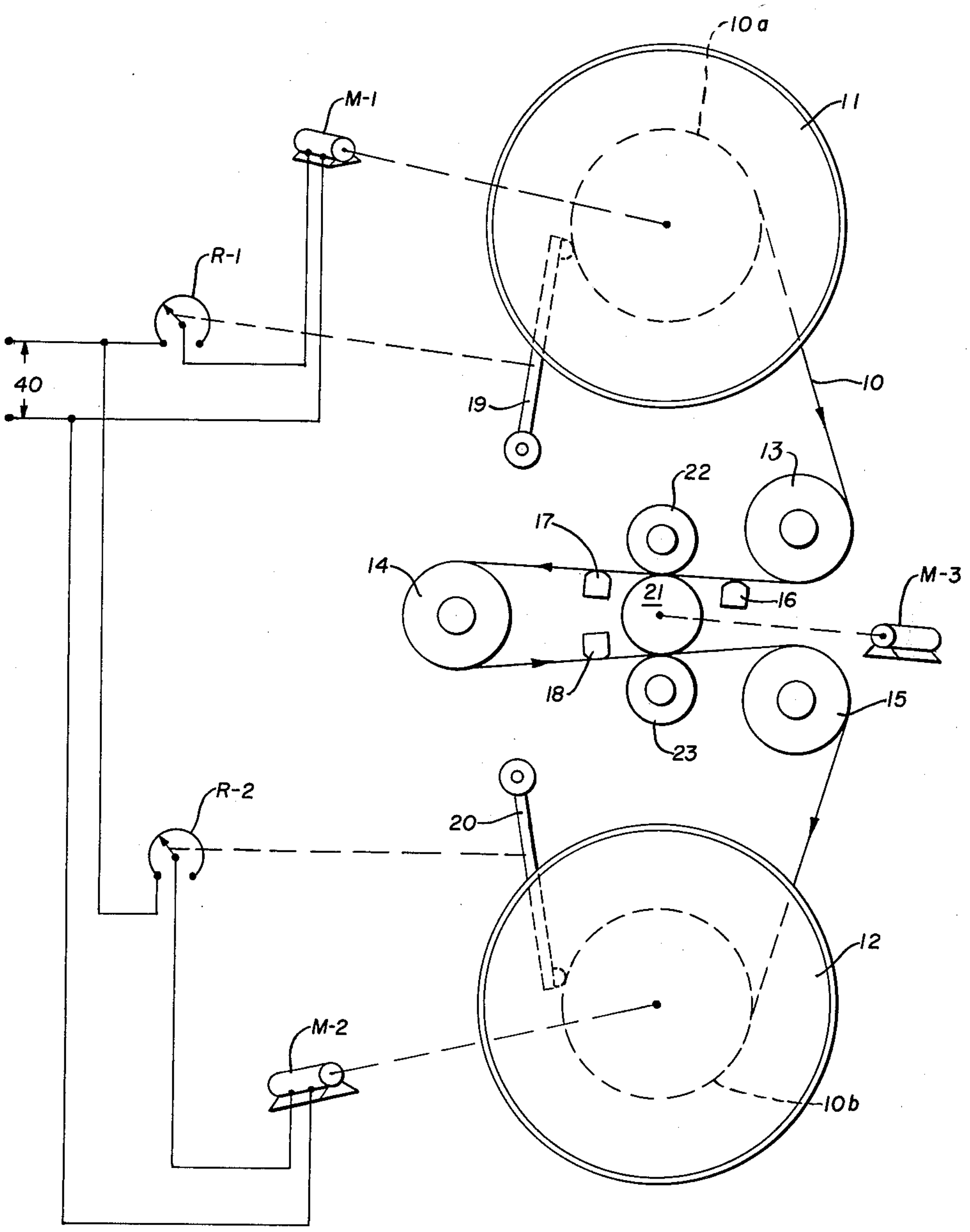
FIGURE 1 is a schematic view showing the present tape transport mechanism.

Referring first to FIGURE 1, the tape transport mechanism includes a supply reel 11, a take-up reel 12, rotary pulleys or guide rollers 13, 14 and 15 between the supply and take-up reels, and a capstan 21. The magnetic tape 10 is advanced from the supply reel 11, across pulley 13, past one side of capstan 21, around pulley 14, past the opposite side of capstan 21, and around pulley 15 to the take-up reel 12. The take-up reel is driven in a forward direction (i.e., in a direction for unwinding the tape from the supply reel) while the supply reel is driven in the reverse direction, so that the tape is under tension between the reels. The take-up reel is over-driven with respect to the supply reel, so that it overcomes the backward torque of the supply reel and causes the tape to advance along the path described. An erase head 16 is located along the path of movement of the tape between the first pulley 13 and the capstan 21. A recording head 17 is located along the path of movement of the tape 10 just beyond the capstan 21 and ahead of the second pulley 14. A reproducing or playback head 18 is located along the path of movement of the magnetic tape after the second pulley 14 and just ahead of the capstan 21. Pressure rollers or pinch rollers 22 and 23 are located at opposite sides of the capstan 20 and are adapted to press the tape 10 against the capstan.

The supply and take-up reels 11 and 12 are driven respectively by electric motors M-1 and M-2. These motors are energized from a suitable power supply 40 through adjustable resistors R-1 and R-2, respectively. The arrangement is such that the speed of each motor varies with the effective resistance of the associated variable resistor R–1 or R–2.

The variable resistors each may be constituted by a continuously-wound resistance element contacted by a movable contact arm, or by a resistance element having a plurality of taps thereon which are contacted by a movable contact arm, or by a plurality of resistors connected individually to snap-acting switches which, when operated by a movable operator, bring such resistors into or out of the energization circuit for the corresponding reel motor.

In any case, the resistors are so chosen that the linear speed of the tape 10 due only to the reel drive is just slightly less than the speed required for recording or playback.

One aspect of the present invention is directed to a novel and advantageous arrangement for varying the speed of each motor, and thus varying the rotational speed of the corresponding reel, as the tape 10 is unwound from the supply reel 11 and is wound up on the take-up reel 12. The purpose of this arrangement is to contribute to the maintenance of a constant linear speed of the tape as it is unwound from the supply reel and taken up by the take-up reel.

In accordance with the present invention, there is provided a pivoted finger 19 which has its free end bearing against the outside of the roll 10*a* of tape on the supply reel 11. This finger 19 is suitably coupled mechanically to the adjustable contact of the resistance R–1 so that, as the tape is unwound from the supply reel and the diameter of the roll 10*a* thereon decreases, the resulting change in the angular position of finger 19 produces a change in the setting of the adjustable contact of resistor R–1, and the effective resistance in the energization circuit for the supply reel motor M–1 is progressively increased. Consequently, the power input to the motor is decreased and the motor tends to slow down as the tape is unwound from the supply reel. As already stated, the supply reel is driven in the reverse direction.

A similar pivoted arm 20 has its free end bearing against the outside of the roll 10*b* of tape on the take-up reel 12. This arm 20 is suitably coupled mechanically to the adjustable contact of resistor R–2. The arrangement is such that, as the tape is wound up on the take-up reel and the diameter of the tape roll 10*b* thereon increases, the effective resistance in the energization circuit of the take-up reel motor M–2 decreases because the motor has to supply an increased torque to maintain the tape tension constant while the amount of tape on the take-up reel is increasing. As stated, the take-up reel is driven in the forward direction and is overdriven with respect to the reverse rotating supply reel.

The conjoint result of these actions is to drive the take-up and supply reels at rotational speeds which gradually vary in a manner so as to tend to maintain the linear speed of the tape and the tension in the tape substantially constant as the tape is unwound from the supply reel and wound up by the take-up reel.

In accordance with the present invention, the arrangement of the motor-driven supply and take-up reels 11 and 12 is such that together they constitute a primary driving means which provides enough power to advance the tape 10 at a speed just slightly less than the required speed for recording or playback. The remaining power required to bring the tape 10 up to its proper speed is supplied by the rotary capstan 21, which is driven by a suitable electric motor M–3. When the pressure rollers or pinch rollers 22 and 23 pinch the tape 10 tightly against the opposite sides of the capstan, there is a captive loop portion of the tape formed between and pinch rollers. This captive loop is mechanically isolated from the remainder of the tape and it moves past the transducer heads 17 and 18 at a linear speed equal to the peripheral speed of the capstan 21. Thus, this captive loop portion of the magnetic tape moves over the transducer heads 17 and 18 at a speed which is determined by the speed of the capstan.

It should be noted particularly that the power required to drive the capstan need be only sufficient to bring the tape up to its required speed for recording or playback from a speed just slightly less than the required speed. The motor-driven supply and take-up reels 11 and 12 provide the power necessary to establish this slightly less speed of the tape, and therefore they supply by far the greater portion of the driving power to the tape.

Figure 2:
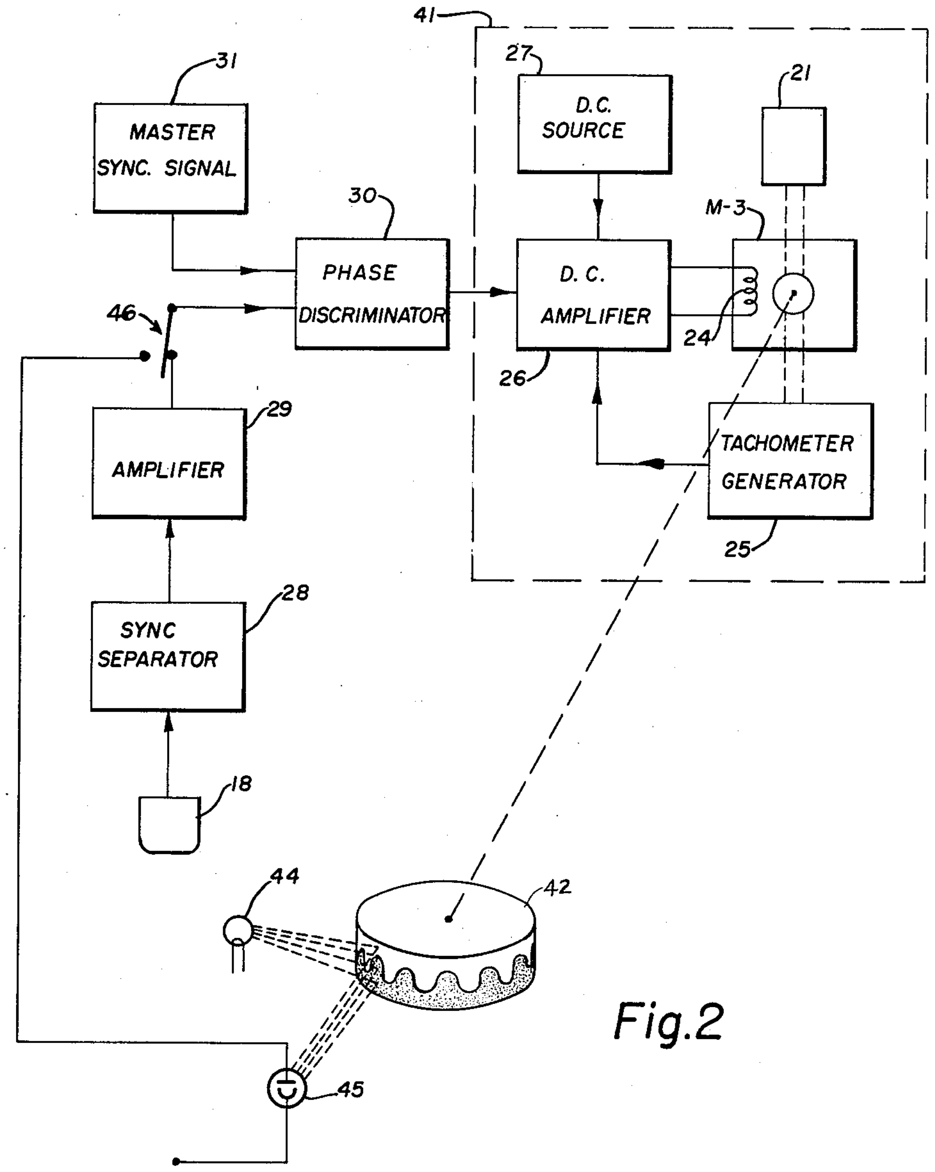
FIGURE 2 is a schematic block circuit diagram of the speed control for the capstan in the present tape transport mechanism.

An approximate speed control for the tape during both recording and playback is provided by the control arrangement enclosed in dotted lines by the box 41 in FIGURE 2. This is a known type of servo control, termed the "Velodyne" control system. The capstan motor M–3 is a split-field D.C. motor which drives both the capstan 21 and a tachometer-generator 25. The D.C. output voltage of the tachometer-generator 25 is proportional to its speed of rotation as determined by the capstan motor M–3. The output voltage of the tachometer-generator 25 is fed into a D.C. amplifier 26 in which it is compared with a predetermined D.C. voltage from a D.C. reference source 27. This reference source may include a potentiometer so that this reference D.C. voltage may be adjusted selectively as desired. The resultant D.C. control signal, which is that difference between the reference D.C. voltage and the output voltage from the tachometer-generator 25, is amplified and applied to one field winding 24 of the capstan motor M–3. The arrangement is such that for a predetermined reference voltage setting of the reference D.C. source 27, the capstan motor M–3 should run at the desired speed. If the motor deviates slightly from this desired speed, the resulting change in the output voltage from the tachometer-generator 25 produces a field unbalance in the motor M–3 which is such as to tend to cause the motor to return to its desired speed of rotation. The gain of the D.C. amplifier 26 is such that full field unbalance is produced in the capstan motor in the event of a relatively small error signal, thus giving a sensitive speed control of the motor. The armature current of the capstan motor is maintained constant and therefore the additional torque produced by the motor is proportional to the degree of field unbalance.

As stated, the just-described "Velodyne" speed control system is in effect during both recording and playback.

In accordance with the present invention, this speed control is supplemented by a novel arrangement for synchronizing the speed of the tape during playback with the speed which it had during recording.

As is well understood, the television signals include line and frame synchronizing signals which occur at regular intervals. In the present invention, such synchronizing signals, which have been recorded on tape 10 at the time the television program was recorded, are picked up by the reproducing head 18. Such recorded synchronizing signals have a recurrence frequency which is representative of the linear speed of the tape 10 during recording. Such synchronizing signals are separated from the video signals in a synchronizing signal separator 28. After amplification in an amplifier 29, these sync signals are compared in a conventional phase discriminator 30 with reference signals from a master source 31. A suitable switch 46 is connected between the amplifier 29 and the phase discriminator 30. The D.C. signal produced by the phase discriminator 30, which is proportional to the phase difference between the reference signals and the sync signals picked up from the tape, is fed to the D.C. amplifier 26 and is combined therein with the D.C. control signal of the previously described "Velodyne" system. The combined control signal then is applied to the field winding 24 of the capstan motor M–3.

In this way, during playback the capstan motor M–3 has a speed (and thus a torque) which is dependent upon the phase of the sync signals picked up from the tape with respect to the reference signals produced by the master source 31. Comparison of the signals may be effected using either the frame or line synchronizing signals, or both, depending upon the accuracy required.

If desired, any other suitable servo system, other than the "Velodyne" system described, may be employed in conjunction with the recorded sync signals to drive the capstan 21 at the proper speed.

In the arrangement described, ignoring the effect of the capstan, the tension in the tape is determined by the forward torque of the take-up reel and the backward or braking torque of the supply reel motor. The capstan motor is required to provide only enough additional power to bring the tape speed and tension up to the required values. Because of the comparatively moderate power requirements for the capstan motor it can be controlled quite precisely as to the torque it exerts on the tape, so that the tape speed and tensnon are held uniform throughout the recording or reproduction operation with a precision heretofore not possible in conventional magnetic recording and/or reproducing equipment.

Also, the speed of the capstan motor M–3 may be controlled during recording, using the same phase discriminator 30 and master source 31 of synchronizing signals as are employed to control the capstan motor during playback, as just described. A sine wave pattern is painted on the periphery of a wheel 42 which is driven by the capstan motor M–3 in unison with the capstan itself. While the capstan motor operates, light from a light source 44 is reflected from this sine wave pattern onto a photoelectric cell 45. The photoelectric cell produces a sine wave signal which is fed into the phase discriminator 30 when switch 46 is in its other position. At the same time the reference signal from the master source 31 is also fed into the phase discriminator 30 and is compared therein with the sine wave signal produced by the photoelectric cell. The resultant output signal from the phase discriminator 30 is fed into the D.C. amplifier 26, where it is combined with the D.C. control signal of the "Velodyne" system. The resultant combined output signal from the D.C. amplifier 26 is applied to the field winding 24 of the capstan motor to control the speed of the motor.

While excellent results have been obtained by applying the error signal to the field winding 24 of the capstan motor, as described, the error signal may be applied in other ways if desired. For example, it may be applied to an eddy current brake or other braking means in the capstan drive to alter the braking effect on the capstan in accordance with the error signal. In such case, a variable speed motor, such as an A.C. induction motor, may be employed. Alternatively, the error signal may be used to vary the pressure of the pinch rollers 22 and 23 on the capstan, thereby selectively varying the friction between the magnetic tape and the capstan, the capstan being driven at a fixed speed slightly greater than the required tape speed.

From the foregoing description, it will be apparent that the illustrated embodiment of this invention is well suited for the accomplishment of its stated purposes. However, it is to be understood that, while there has been described in detail herein and illustrated in the accompanying drawing a particular presently-preferred embodiment of this invention, various modifications, omissions and refinements which depart from the disclosed embodiment may be adopted without departing from the spirit and scope of this invention.

We claim:

1. In a magnetic recording and/or reproducing apparatus having a rotary supply reel and a rotary take-up reel, the improvement which comprises means for driving said reels at speeds effective to advance the tape from the supply reel to the take-up reel under the combined action of the reels only at a speed slightly less than the required speed, a rotary capstan located along the path of movement of the tape between the supply and take-up reels, and means for driving the capstan at a speed effective to increase the tape speed up to said required speed when the capstan is in driving engagement with the tape, said means for driving the reels supplying substantially greater power for advancing the tape than said means for driving the capstan.

2. In a magnetic recording and/or reproducing apparatus, the combination of a rotary supply reel with a roll of magnetic tape thereon and a rotary take-up reel which withdraws the tape from the supply reel, means for driving said reels to unwind the tape under tension from the supply reel, said reels together being effective to advance the tape along a predetermined path of movement between the reels at a speed slightly less than the required speed and exerting on the tape a tension slightly less than the required tension, a rotary capstan located along said path of movement of the tape inside a loop portion formed by the tape, a pair of pinch rollers located outside said loop portion of the tape and at opposite sides of the capstan, said pinch rollers being engageable with the tape to pinch the tape against said opposite sides of the capstan so that the tape is driven by the capstan and said loop portion of the tape is isolated mechanically from the remainder of the tape, means for driving the capstan at a peripheral speed equal to said required speed for the tape when the tape is pinched against the capstan, said capstan driving means causing the capstan to exert sufficient additional tension on the tape to increase the tape tension to said required value, and a magnetic transducer head in transducing relationship to the tape at said loop portion thereof, said reel driving means supplying substantially greater power than said capstan driving means for advancing the tape.

3. The mechanism of claim 2 wherein there is provided means for controlling said capstan driving means to drive the capstan at a speed determined by the movement of the tape, so as to maintain the tape speed and tension at said required values.

4. The mechanism of claim 2 wherein there is provided means for sensing the speed of the tape and for controlling said capstan driving means in accordance with the tape speed so as to maintain the tape speed and tension at said required values.

5. In an apparatus for reproducing a television program from a magnetic tape on which the video signals of the program were recorded along with line and frame synchronization signals, the combination of a rotary supply reel adapted to have the tape stored in a roll thereon, a rotary take-up reel for withdrawing the tape from the supply reel, means for driving the take-up reel in a forward direction to withdraw the tape from the supply reel along a predetermined path of movement between the reels, means imparting a reverse torque to the supply reel which is overcome by the forward pull exerted on the tape by the take-up reel, said reels together being effective to advance the tape along said path of movement at a speed slightly less than the required speed for reproduction and exerting on the tape a tension slightly less than the required tension for reproduction a rotary capstan located along said path of movement inside a loop portion formed by the tape, a pair of pinch rollers located outside said loop portion of the tape and at opposite sides of the capstan, said pinch rollers being engageable with the tape to pinch the tape against said opposite sides of the capstan so that the tape is driven by the capstan and said loop portion of the tape is isolated mechanically from the remainder of the tape, drive means for driving said capstan at a peripheral speed equal to said required speed for the tape when the tape is pinched against the capstan, said capstan drive means causing the capstan to exert sufficient additional tension on the tape to increase the tape tension to said required value, said means for driving the take-up reel supplying substantially greater power than said capstan drive means for advancing the tape, and means for controlling the operation of said capstan drive means so as to maintain the tape speed and tension constant at said required values, said last-mentioned means including means for reproducing the recorded synchronization signals from the tape as the tape is advanced from the supply reel to the take-up reel during playback, means for comparing the phase of said reproduced synchronization signals with the signals from a reference source, and means for operating said capstan drive means in accordance with the phase comparison between said signals.

6. The apparatus of claim 5 wherein said capstan drive means is a split-field motor, and said last-mentioned means produces a D.C. error signal whose magnitude is proportioned to the phase difference between said signals, said last-mentioned means being coupled to a field winding in said motor and being operative to produce field unbalance in the motor in response to errors in the tape speed during playback.

References Cited in the file of this patent

UNITED STATES PATENTS

| | | |
|---|---|---|
| 2,168,777 | McCreary | Aug. 8, 1939 |
| 2,365,691 | Fodor | Dec. 26, 1944 |
| 2,814,676 | House | Nov. 26, 1957 |
| 2,836,650 | Johnson | May 27, 1958 |
| 2,866,012 | Ginsburg | Dec. 23, 1958 |
| 2,873,318 | Moore | Feb. 10, 1959 |
| 2,903,521 | Ellison | Sept. 8, 1959 |
| 2,907,818 | Wetzel | Oct. 6, 1959 |
| 2,909,337 | Lahti et al. | Oct. 20, 1959 |

OTHER REFERENCES

RCA Review, September 1956, vol. VXII, No. 3, "A Magnetic Tape System (Part III), the Tape Transport Mechanism," pages 350–375.